(12) United States Patent
Karol et al.

(10) Patent No.: US 11,708,260 B2
(45) Date of Patent: Jul. 25, 2023

(54) BEVERAGE DISPENSE MONITORING WITH CAMERA

(71) Applicant: PepsiCo, Inc., Purchase, NY (US)

(72) Inventors: Samuel Karol, Hawthorne, NY (US); Anthony Romano, West Dundee, IL (US); Thore Mainart Bücking, Hitchin (GB); Timothy Charles King, Cambridge (GB); Joseph Albert Dolphin, Cambridge (GB); Roger Bradley Millington, Huntingdon (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/648,484

(22) Filed: Jan. 20, 2022

(65) Prior Publication Data

US 2022/0144618 A1    May 12, 2022

Related U.S. Application Data

(63) Continuation of application No. 16/992,937, filed on Aug. 13, 2020, now Pat. No. 11,261,076.

(51) Int. Cl.
*G01N 21/29* (2006.01)
*B67D 1/08* (2006.01)
(Continued)

(52) U.S. Cl.
CPC ......... *B67D 1/0888* (2013.01); *B67D 1/0875* (2013.01); *G01N 21/29* (2013.01);
(Continued)

(58) Field of Classification Search
CPC .......... G01N 15/0227; G01N 15/0211; G01N 2015/0026; G01N 2021/8433;
(Continued)

(56) References Cited

U.S. PATENT DOCUMENTS

| 4,987,083 A * | 1/1991 | Apple ................. G01N 21/314 141/105 |
| 5,822,073 A | 10/1998 | Yee et al. |
| 6,226,081 B1 | 5/2001 | Fantone et al. |

(Continued)

FOREIGN PATENT DOCUMENTS

| CA | 2543001 A1 | 10/2006 |
| CA | 2941370 C | 7/2018 |

(Continued)

OTHER PUBLICATIONS

International Search Report and Written Opinion in PCT/US21/45565, dated Dec. 3, 2021, 36 pages.

*Primary Examiner* — Michael P Stafira
(74) *Attorney, Agent, or Firm* — Sterne, Kessler, Goldstein & Fox P.L.L.C.

(57) ABSTRACT

A beverage dispenser includes a nozzle to dispense a beverage. The beverage dispenser further includes a camera to capture an image of the beverage as the beverage is dispensed from the nozzle. The camera has a field of view that includes the beverage. The beverage dispenser further includes a light source that illuminates the field of view of the camera. The beverage dispenser further includes a computer. The computer analyzes the image of the beverage and determines a characteristic of the beverage.

21 Claims, 9 Drawing Sheets

(51) Int. Cl.
  *G06T 7/90* (2017.01)
  *G06V 10/56* (2022.01)
  *B67D 1/00* (2006.01)
  *G01N 21/17* (2006.01)
  *G06V 20/68* (2022.01)

(52) U.S. Cl.
  CPC .......... *G01N 21/293* (2013.01); *G06T 7/90* (2017.01); *G06V 10/56* (2022.01); *B67D 1/0022* (2013.01); *G01N 2021/1765* (2013.01); *G06V 20/68* (2022.01)

(58) Field of Classification Search
  CPC .. G01N 21/211; G01N 21/49; G01N 21/8806; G01N 13/02; G01N 2013/025; G01N 2015/0011; G01N 21/253; G01N 1/312; G01N 2201/104; G01N 35/1002; G01N 2021/1765; G01N 21/0303; G01N 21/27; G01N 21/29; G01N 21/293; G01N 21/51; G01N 33/14; G01N 33/143; G01N 33/146; G01N 33/28; G01N 35/1011; G01N 15/02; G01N 2021/6417; G01N 2035/1041; G01N 21/3563; G01N 21/359; G01N 21/88; G01N 21/93; G01N 21/9508; G01N 2500/04; G01N 27/048; G01N 27/302; G01N 33/5005; G01N 33/5432; G01N 33/569; G01N 35/1074; G01N 2021/6419; G01N 2021/6421; G01N 2021/6441; G01N 2021/8854; G01N 2021/8887; G01N 2035/00366; G01N 2035/00574; G01N 2035/00891; G01N 2035/1037; G01N 2035/1039; G01N 21/274; G01N 21/278; G01N 33/0098; G01N 33/53; G01N 33/5308; G01N 35/00029; G01N 35/00693; G01N 35/00722; G01N 35/026; G01N 35/10; G01N 35/1016; G01N 21/6456; G01N 21/85; G01N 21/94; G01N 33/04; G01N 21/78; G01N 2021/6439; G01N 2021/8841; G01N 21/8851; G01N 2201/129; G01N 33/54386; G01N 33/582; G01N 15/1463; G01N 15/1475; G01N 17/008; G01N 2015/1472; G01N 2015/1479; G01N 2015/1486; G01N 2015/1488; G01N 2015/1497; G01N 2021/8427; G01N 2021/8466; G01N 2021/8829; G01N 2021/945; G01N 2035/00158; G01N 2035/0424; G01N 21/01; G01N 21/59; G01N 21/6408; G01N 21/6428; G01N 21/6447; G01N 21/6452; G01N 21/6486; G01N 21/8422; G01N 21/8507; G01N 21/8803; G01N 2333/43595; G01N 2333/726; G01N 33/5008; G01N 33/5014; G01N 33/5035; G01N 33/5076; G01N 33/5079; G01N 33/5082; G01N 33/533; G01N 33/566; G01N 1/2202; G01N 1/2273; G01N 15/06; G01N 15/0612; G01N 2001/2223; G01N 2015/0088; G01N 2015/0687; G01N 2015/0693; G01N 2015/1006; G01N 2021/7759; G01N 2021/7786; G01N 2035/00237; G01N 2035/00326; G01N 2035/00495; G01N 2035/00881; G01N 2035/1076; G01N 21/64; G01N 21/6458; G01N 21/84; G01N 2333/75; G01N 2510/00; G01N 31/227; G01N 33/48707; G01N 33/4905; G01N 33/502; G01N 33/86; G01N 35/00; G01N 35/00584; G01N 35/0092; G01N 35/0099; G01N 35/1009; G01N 35/1065; G02B 23/243; G02B 23/2484; G02B 23/2423; G02B 21/0036; G02B 21/16; G02B 21/26; G02B 23/2415; G02B 23/2469; G02B 30/34; G02B 21/0012; G02B 21/22; G02B 13/06; G02B 19/0057; G02B 23/2461; G02B 23/2476; G02B 3/0037; G02B 3/0056; G02B 1/18; G02B 21/36; B67D 1/0888; B67D 1/0021; B67D 1/0022; B67D 1/0056; B67D 1/0875; B67D 1/0882; B67D 1/0004; B67D 1/04; B67D 1/0869; B67D 1/0895; B67D 1/1252; B67D 2001/0481; B67D 1/008; B67D 1/0437; B67D 1/07; B67D 1/0861; B67D 1/0884; B67D 1/0885; B67D 1/10; B67D 2001/0092; B67D 2001/0814; B67D 2001/082; B67D 2210/00031; B67D 2210/00118; B67D 3/0032; G06T 7/292; G06T 2207/10024; G06T 17/00; G06T 19/003; G06T 2210/21; G06T 2207/30148; G06T 7/248; G06T 2207/10152; G06T 7/001; G06T 2207/10064; G06T 2207/10068; G06T 2207/10081; G06T 2207/10132; G06T 2207/20221; G06T 7/30; G06T 7/60; G06T 2207/10028; G06T 2207/10012; G06T 7/0008; G06T 7/521; G06T 7/593; G06T 7/62; G06T 7/74; G06T 2207/10016; G06T 2207/20081; G06T 2207/20084; G06T 2207/30088; G06T 2207/30096; G06T 2207/30196; G06T 2207/30232; G06T 2207/30241; G06T 2207/30242; G06T 7/0012; G06T 7/246; G06T 7/75; G06T 7/97; G06T 3/4007; G06T 2207/10004; G06T 2207/20132; G06T 2207/20164; G06T 2207/30176; G06T 5/009; G06T 7/40; G06T 7/90; G06T 2207/30128; G06T 7/0004; G06T 2207/10048; G06T 2207/30201; G06T 7/50; G06T 2207/30108; G06T 5/002; G06T 7/13; G06T 7/70; G06V 20/68; G06V 10/247; G06V 10/25; G06V 20/52; G06V 30/142; G06V 30/40; G06V 30/413; G06V 30/414; G06V 40/166; G06V 40/19; G06V 40/161; G06V 40/165; G06V 10/143; G06V 10/56; G06V 20/46; G06V 20/60; G06V 40/28; G06V 20/20; G06V 20/64; G06V 40/171; G06V 40/172; G06V 40/178; G06V 40/40; G06V 40/45; G06V 10/60; G06V 20/10; G06V 40/1365; G06V 10/48; G06V 10/752; G06V 20/17; G06V 20/695; G06V 40/10; G06V 40/20; B67C 2003/227; B67C 2003/228; B67C 3/242; B67C 7/0073; B67C 3/22; B67C 7/00
  See application file for complete search history.

(56) References Cited

U.S. PATENT DOCUMENTS 6,374,845 B1    4/2002   Melendez et al.
7,812,312 B2   10/2010   Mantele et al.

(56) References Cited

U.S. PATENT DOCUMENTS

| | | |
|---|---|---|
| 8,302,473 B2 | 11/2012 | Ramus et al. |
| 8,338,811 B2 | 12/2012 | Lang et al. |
| 9,010,580 B2 | 4/2015 | Rolek |
| 9,448,166 B1 | 9/2016 | Rainer |
| 9,500,583 B2 | 11/2016 | Jiang et al. |
| 9,796,575 B2 | 10/2017 | Deng et al. |
| 10,233,069 B2 | 3/2019 | Chase et al. |
| 2008/0264092 A1 | 10/2008 | Chase et al. |
| 2017/0066252 A1 | 3/2017 | Eliav et al. |
| 2017/0262729 A1* | 9/2017 | Penna .................. A47J 31/521 |
| 2018/0129360 A1 | 5/2018 | Suh |
| 2018/0201492 A1 | 7/2018 | Jung et al. |
| 2019/0345018 A1* | 11/2019 | Garcia ................ B67D 3/0093 |
| 2020/0031656 A1 | 1/2020 | Rudick et al. |
| 2020/0095110 A1 | 3/2020 | Pohl et al. |
| 2020/0198956 A1 | 6/2020 | Hartsfield et al. |
| 2020/0231426 A1 | 7/2020 | Edwards et al. |

FOREIGN PATENT DOCUMENTS

| | | | | |
|---|---|---|---|---|
| CA | 3065052 A1 | * | 6/2020 | ........... B67D 1/0875 |
| CN | 108701244 A | * | 10/2018 | .......... A47J 31/4492 |
| EP | 1833750 B1 | | 9/2008 | |
| EP | 2284517 A1 | | 2/2011 | |
| JP | 1507415 B2 | | 7/2010 | |
| RU | 2435508 C2 | * | 12/2011 | ............ A47J 31/057 |
| WO | WO-2017079366 A1 | * | 5/2017 | ........... B05B 12/082 |
| WO | WO-2018232749 A1 | * | 12/2018 | ............... B67C 3/22 |
| WO | WO-2019084348 A1 | * | 5/2019 | ........ B05C 11/1026 |
| WO | WO-2019102512 A1 | * | 5/2019 | ............ A47J 31/057 |
| WO | 2019158563 A1 | | 8/2019 | |
| WO | WO-2019158563 A1 | * | 8/2019 | ............... B67D 1/06 |
| WO | 2019180252 A1 | | 9/2019 | |
| WO | 2019216102 | | 11/2019 | |
| WO | WO-2020061544 A1 | * | 3/2020 | ........... B22D 23/003 |

\* cited by examiner

US 11,708,260 B2

BEVERAGE DISPENSE MONITORING WITH CAMERA

FIELD

Embodiments described herein generally relate to beverage dispensing. Specifically, embodiments described herein relate to beverage dispense monitoring with a camera.

BACKGROUND

Beverage dispensers may dispense beverages that are made within the beverage dispenser by mixing two or more ingredients, such as water, an additive ingredient (e.g., syrup), and optionally carbonation. The ingredients may be stored in canisters and a single dispenser may contain multiple canisters, each associated with various beverages or flavors. Improper mixing of the two or more ingredients can lead to poor taste and customer dissatisfaction.

BRIEF SUMMARY OF THE INVENTION

Some embodiments described herein relate to a beverage dispenser including a nozzle configured to dispense a beverage, a camera configured to capture an image of the beverage as the beverage is dispensed from the nozzle, the camera having a field of view that includes the beverage. The beverage dispenser also including a light source that is configured to illuminate the field of view of the camera.

In any of the various embodiments discussed herein, the nozzle is configured to dispense a plurality of beverages, and the beverage is one of the plurality of beverages.

In any of the various embodiments discussed herein, the image includes optical data.

In any of the various embodiments discussed herein, the camera is a RGB camera.

In any of the various embodiments discussed herein, the field of view of the camera extends perpendicular to a direction along which the beverage is configured to be dispensed.

In any of the various embodiments discussed herein, the beverage dispenser includes a dispense bay, and the camera is angularly mounted outside of the dispense bay above and lateral to the nozzle.

In any of the various embodiments discussed herein, the light source opposes the field of view of the camera.

Some embodiments described herein relate to a method of monitoring a beverage dispensed from a beverage dispenser including dispensing the beverage from a nozzle of the beverage dispenser, capturing, while dispensing the beverage, an image of the beverage as the beverage is dispensed from the nozzle using a camera of the beverage dispenser, and analyzing the image to determine a characteristic of the beverage.

In any of the various embodiments discussed herein, the characteristic is an additive ingredient characteristic comprising a concentration or ratio of an additive ingredient of the beverage relative to other ingredients of the beverage.

In any of the various embodiments discussed herein, the additive ingredient comprises at least one a flavoring, an enhancer, a sweetener, and a coloring.

In any of the various embodiments discussed herein, the other ingredients comprise at least one of a base ingredient and a supplemental base ingredient.

In any of the various embodiments discussed herein, the base ingredient comprises a consumable liquid and the supplemental base ingredient comprises a consumable gas.

In any of the various embodiments discussed herein, the characteristic is a presence of carbonation.

In any of the various embodiments discussed herein, the characteristic is a presence of water.

In any of the various embodiments discussed herein, the method includes determining an error in the dispensing of the beverage based upon the characteristic of the beverage.

Some embodiments described herein relate to a beverage dispenser including a nozzle configured to dispense a beverage, a camera configured to capture an image of the beverage as the beverage is dispensed from the nozzle, a computer, and a non-transitory computer readable medium operatively connected to the computer, the non-transitory computer readable medium comprising instructions that when executed by the computer cause the computer to analyze the image of the beverage and determine a characteristic of the beverage.

In any of the various embodiments discussed herein, the instructions when executed by the computer cause the computer to determine an error in dispensing of the beverage based upon the characteristic of the beverage.

In any of the various embodiments discussed herein, the characteristic is an additive ingredient characteristic comprising a concentration or ratio of an additive ingredient of the beverage relative to other ingredients of the beverage.

In any of the various embodiments discussed herein, the analyze the image includes a linear unmixing analysis.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
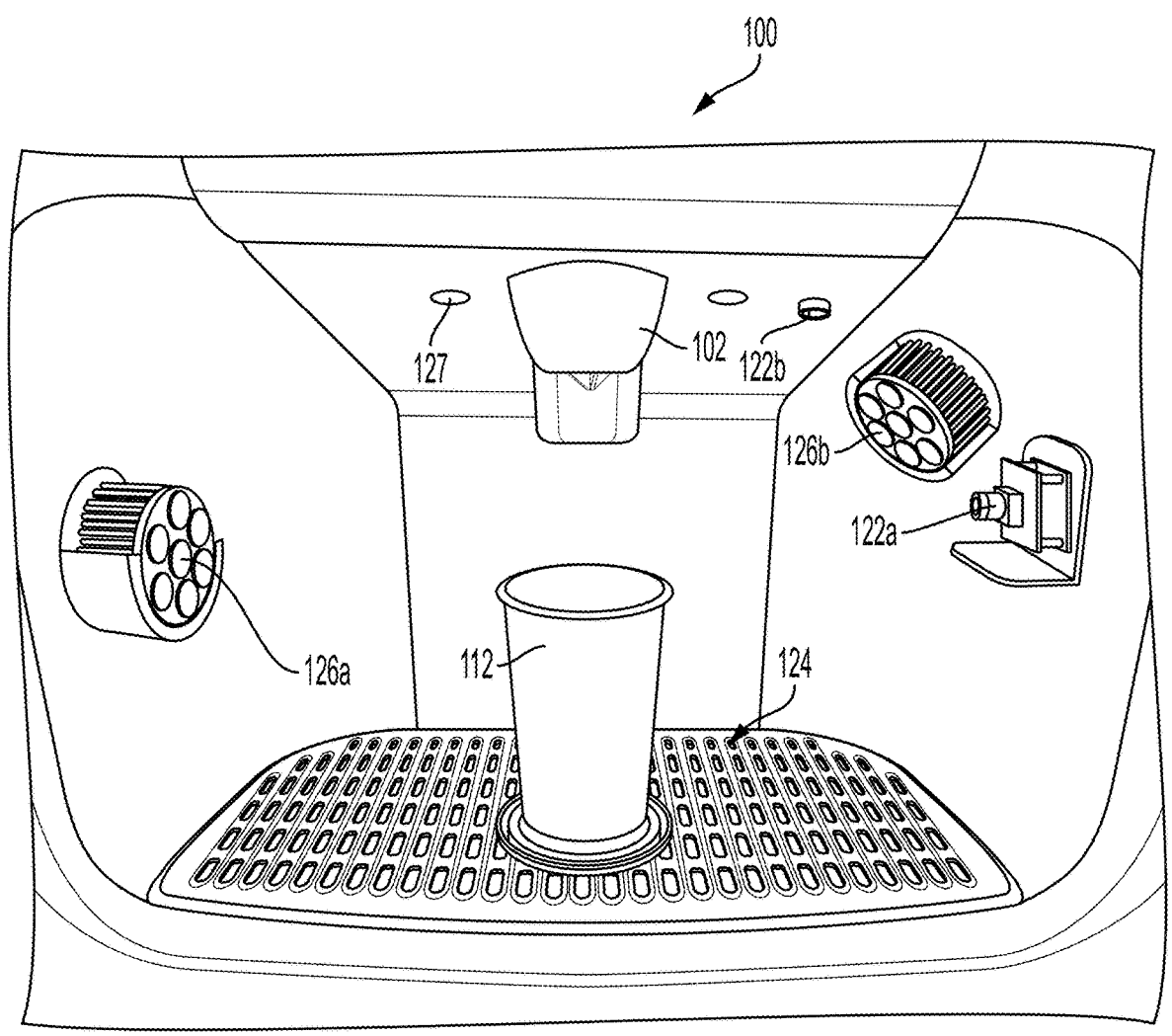
FIG. 1 shows a perspective view of an exemplary beverage dispenser according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Beverage dispensing systems can mix two or more ingredients, e.g., a base ingredient and an additive ingredient, to form a beverage. For example, many beverage dispensers have a water line to supply water as a base ingredient and one or more containers that hold flavorings as additive ingredients. The ingredients can be dispensed from a single nozzle capable of dispensing a plurality of different beverages. Multiple nozzles, which may dispense a single beverage per nozzle, can be also be employed.

Ensuring that ingredients are dispensed in accordance with prescribed beverage recipes is critical to beverage quality. For example, if too little additive ingredient is used, the dispensed beverage can be diluted and will not achieve the desired flavor profile for the beverage. Similarly, for carbonated beverages too much or too little gas can alter the carbonation of the dispensed beverage.

Beverage dispenser operators ensure that ingredients are supplied in accordance with the prescribed beverage recipes. Beverage manufacturers can have limited control over operators, particularly when operators are managed by third-party employers such as restaurants, movie, theatres, or other locations at which food and beverages are commonly sold. Dispense issues can degrade consumers' impression of the dispensed beverage. Negative consumer experiences with beverage dispensers can adversely impact future sales. Accordingly, there exists a need for low cost automation of the monitoring of the dispensed beverage to ensure consistent quality of dispensed beverages.

Some embodiments described herein relate to a beverage dispenser that can include a nozzle configured to dispense a beverage. The beverage dispenser can also include a camera configured to capture an image of the beverage as the beverage is dispensed from the nozzle. The camera can have a field of view that includes the nozzle. The beverage dispenser can also include a light source that is configured to illuminate the field of view of the camera.

In embodiments, the beverage dispenser can include a computer and a non-transitory computer readable medium operatively connected to the computer. The non-transitory computer readable medium can include instructions that when executed by the computer cause the computer to analyze the image of the beverage and determine a characteristic of the beverage.

Some embodiments described herein relate to a method of monitoring a beverage dispensed from a beverage dispenser. The method can include dispensing the beverage from a nozzle of the beverage dispenser. The method can include capturing, while dispensing the beverage, an image of the dispensed beverage as the beverage is dispensed from the nozzle using a camera of the beverage dispenser. The method can include analyzing the image to determine a characteristic of the dispensed beverage.

Embodiments of the disclosure address the need for efficient automation of monitoring of the dispensed beverage and improve consistent quality of dispensed beverages. For example, embodiments of the disclosure can detect improper ingredient ratios or amounts in the dispensed beverage.

Figure 2:
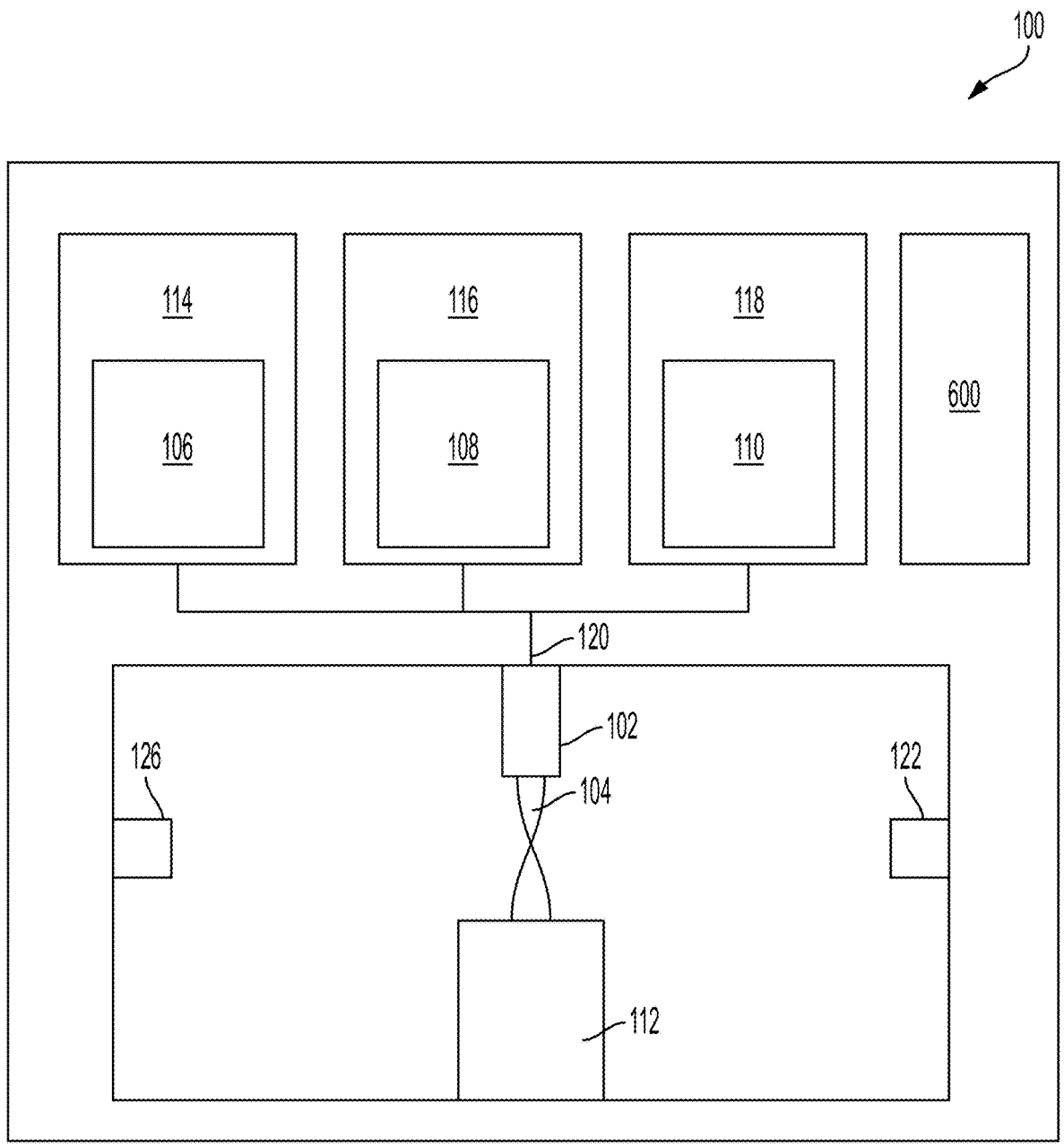
FIG. 2 shows a schematic view of an exemplary beverage dispenser according to an embodiment.

FIG. 1 shows a perspective view of an exemplary beverage dispenser 100 in accordance with aspects of the disclosure. FIG. 2 shows a schematic view of beverage dispenser 100. In embodiments, beverage dispenser 100 includes a nozzle 102 that dispenses a beverage 104. As used herein, the term "beverage" may refer to a base ingredient 106, with or without a supplemental base ingredient 108, and alone or in combination with one or more additive ingredient 110. The beverage 104 may be dispensed in a cup 112.

As used herein, the term "base ingredient" may refer to any free-flowing consumable liquid, such as water, or dairy-based beverages, such as milk, among others.

As used herein, the term "supplemental base ingredient" may refer to any consumable gas, such as carbon dioxide, pressurized nitrogen, or other suitable gas, that can be infused or dissolved into base ingredient 106. Reference to "carbonate" or "carbonation" as used herein includes infusing or dissolving carbon dioxide or any other supplemental base ingredient 108 into base ingredient 106.

As used herein, the term "additive ingredient" may refer to a particular flavoring, such as cola, grape, orange, lemon-lime, cherry, or vanilla, among others, or may refer to an enhancer (e.g., multi-vitamin complexes, minerals, and energy boosters), sweetener, or coloring, whether in the form of a liquid, syrup, or concentrate, or other form.

In embodiments, beverage dispenser 100 may include one or a plurality of nozzles 102. Each of the plurality of nozzles 102 may dispense one dedicated beverage 104. As used herein, reference to "each" encompasses embodiments of beverage dispenser 100 including any number of the named structure. For example, reference to each nozzle 102 encompasses embodiments of beverage dispenser 100 including any number of nozzles 102, including only a single nozzle 102.

In embodiments, each nozzle 102 may dispense a plurality of different beverages 104. That is, a single nozzle 102 may be configured to dispense a plurality of different beverages 104.

In alternative embodiments, beverage dispenser 100 can include only one nozzle 102. The single nozzle 102 may be configured to dispense a plurality of different beverages.

In embodiments, beverage dispenser 100 can include one or more base ingredient supply 114 that supplies one or more base ingredient 106 to nozzle 102. Base ingredient supply 114 can supply at least one base ingredient 106 (e.g., water, milk, etc., as previously described) to each nozzle 102. Base ingredient supply 114 can be a water line connected to a local water supply. The water line can include a filter. Base ingredient supply 114 can be one or more container containing base ingredient 106. Base ingredient supply 114 can include a pump to pump base ingredient 106 through an ingredient pathway 120, as discussed further herein.

In embodiments, base ingredient supply 114 can supply a single base ingredient 106 to each nozzle 102. In alternative embodiments, base ingredient supply 114 can supply more than one base ingredient 106 to each nozzle 102.

In some embodiments having more than one nozzle 102, base ingredient supply 114 can supply one base ingredient 106 to one or more nozzle 102 and another different base ingredient 106 to one or more different nozzle 102. In embodiments, base ingredient 106 can be supplied to nozzle 102 with or without supplemental base ingredient 108.

In embodiments, beverage dispenser 100 can include one or more supplemental base ingredient supply 116 that supplies one or more supplemental base ingredient 108 for infusion or dissolution with base ingredient 106. Supplemental base ingredient supply 116 can supply at least one supplemental base ingredient 108 (e.g., carbon dioxide, as previously described) to each base ingredient 106. Supplemental base ingredient supply 116 can be a container containing supplemental base ingredient 108.

In embodiments, supplemental base ingredient supply 116 can store supplemental base ingredient 108 at a pressure greater than atmospheric pressure.

In embodiments, supplemental base ingredient supply 116 can store supplemental base ingredient 108 at a pressure sufficient to maintain supplemental base ingredient 108 in a liquid phase in the container. Supplemental base ingredient 108 can transition from a liquid to a gas phase after leaving supplemental base ingredient supply 116.

In embodiments, supplemental base ingredient supply 116 can include a pump to pump supplemental base ingredient 108 through ingredient pathway 120. Supplemental base ingredient 108 can be infused with or dissolved into base ingredient 106 at any point of ingredient pathway 120.

In embodiments, beverage dispenser 100 may include no supplemental base ingredient supply 116. For example, supplemental base ingredient 108 may be infused with or dissolved into base ingredient 106 and supplied with base ingredient 106 from base ingredient supply 114.

In embodiments, beverage dispenser 100 can include one more additive ingredient supply 118 that supplies one or more additive ingredient 110 to nozzle 102. Additive ingredient supply 118 can supply at least one additive ingredient 110 (e.g., flavoring, enhancer, sweetener, coloring, etc., as previously described) to each nozzle 102. Additive ingredient supply 118 can be one or more container containing an additive ingredient 110. Additive ingredient supply 118 can include a pump to pump additive ingredient 110 through the ingredient pathway 120.

In embodiments, additive ingredient supply 118 can supply a single additive ingredient 110 to each nozzle 102.

In alternative embodiments, additive ingredient supply 118 can supply more than one additive ingredient 110 to each nozzle 102 such that each nozzle 102 may dispense more than one beverage 104.

In some embodiments having more than one nozzle 102, additive ingredient supply 118 can supply one additive ingredient 110 to one or more nozzle 102 and another different additive ingredient 110 to one or more different nozzle 102 such that each nozzle 102 may supply a dedicated beverage 104.

In embodiments, base ingredient 106 can be supplied to nozzle 102 with or without additive ingredient 110. Additive ingredient 110 can be infused with or dissolved into base ingredient 106 at any point of ingredient pathway 120.

As discussed previously, in embodiments beverage dispenser 100 can include ingredient pathway 120 that connects base ingredient, supplemental base ingredient, or additive ingredient supplies 114, 116, 118 to nozzle 102. Ingredient pathway 120 can fluidly connect base ingredient, supplemental base ingredient, or additive ingredient supplies 114, 116, 118 to one or more nozzle 102 of beverage dispenser 100. Ingredient pathway 120 can include hoses, pipes, connectors, or the like. Ingredient pathway 120 may include valves to control flow base ingredient 106, supplemental base ingredient 108, or additive ingredient 110. Valves may be mechanically or electromechanically controlled.

In embodiments, beverage dispenser 100 can include a camera 122 that can capture an image of the dispensed beverage 104 during dispensing and in real time. Camera 122 can capture an image of beverage 104 during dispensing from nozzle 102. The image may include optical data. Camera 122 may include an imaging system configured to separately receive different color ranges.

In embodiments, camera 122 may separately receive a plurality of color ranges, including for example red, green, and blue color ranges. Camera 122 may be an affordable, commercially available camera 122.

In embodiments, camera 122 may be an RGB camera.

In embodiments, camera 122 may be a rolling shutter camera.

In embodiments, camera 122 may be a global shutter camera.

In embodiments, camera 122 may image at a standard Super Extended Graphics Array resolution, i.e., a resolution of 1280×1024 pixels.

Beverage dispenser 100 can include one or more camera 122. In embodiments, a single camera 122 can be provided for each nozzle 102.

In embodiments, multiple cameras 122 (e.g., two cameras) mounted at different positions may be provided for each nozzle 102.

Camera 122 can be mounted relative to nozzle 102 such that nozzle 102, dispensed beverage 104, and/or cup 112 is within the field of view of camera 122.

In embodiments, camera 122 may be mounted such that the field of view of camera 122 includes portions of each of nozzle 102, dispensed beverage 104, and cup 112.

Figure 3A:
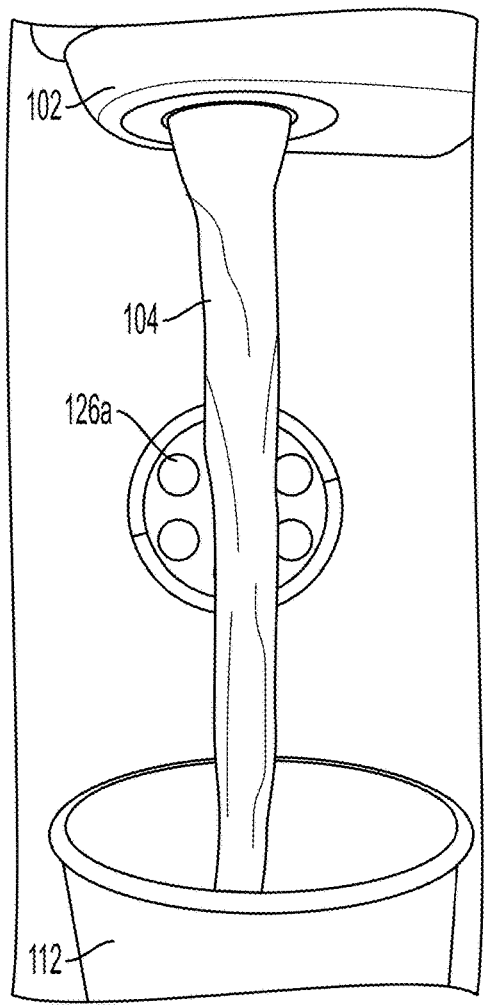
FIGS. 3A and 3B show the field of view of cameras of the beverage dispenser of FIG. 1.

As shown in FIG. 1, in embodiments beverage dispenser 100 can include a first camera 122a and a second camera 122b. First camera 122a may be mounted to the side (e.g., perpendicularly) of nozzle 102 and cup 112. FIG. 3A shows the field of view of first camera 122a of FIG. 1, which includes nozzle 102, cup 112, and dispensed beverage 104. The field of view of first camera 122a can extend perpendicular to a direction along which beverage 104 can be dispensed.

In embodiments, first camera 122a may include a suitable lens such that a part of the field of view can be effectively perpendicular to the direction along which beverage 104 can be dispensed, while a different part of the field of view can be more down-ward facing.

Figure 3B:
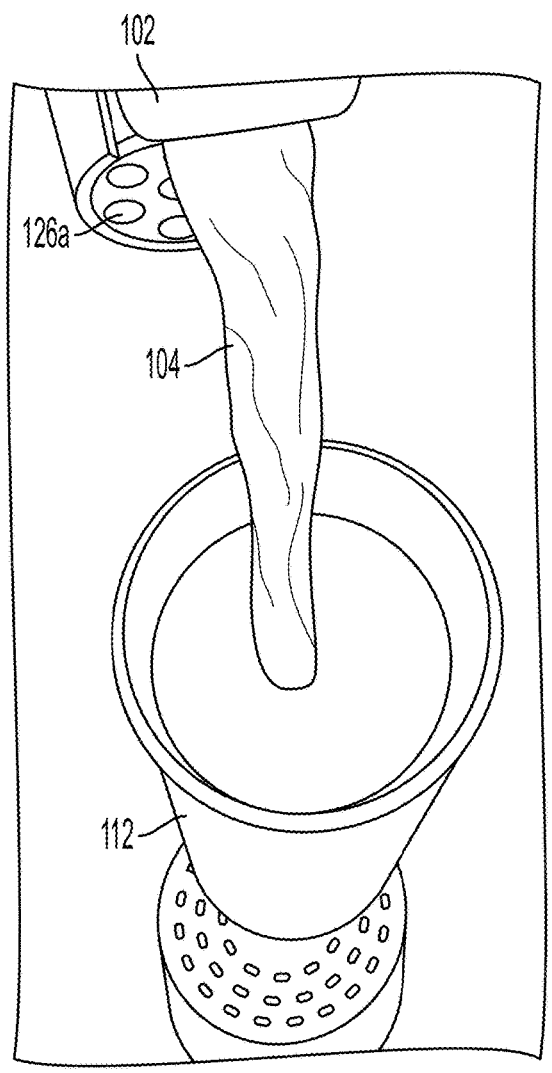

Second camera 122b may be angularly mounted above and to a side of nozzle 102 such that nozzle 102, dispensed beverage 104, and cup 112 are each within the field of view. FIG. 3B shows the field of view of second camera 122b of FIG. 1, which includes nozzle 102, cup 112, and dispensed beverage 104.

In embodiments, camera 122 may be mounted outside of a dispense bay 124 of beverage dispenser 100. For example, second camera 122b may be angularly mounted outside of dispense bay 124 at a position above and lateral to nozzle 102.

In embodiments, camera 122 may be mounted inside of dispense bay 124. For example, first camera 122a may be mounted inside of the dispense bay 124.

Although FIG. 1 includes first and second cameras 122a, 122b, in embodiments beverage dispenser 100 may include only one camera 122 (e.g., only first camera 122a).

In embodiments, camera 122 may be mounted with a universal bracket that may mount a plurality of different types of cameras.

According to embodiments, the field of view of camera 122 can provide a view of dispensed beverage 104 while also allowing sufficient field of view into cup 112 for, e.g., determining fill level of cup 112.

In embodiments, beverage dispenser 100 can include a light source 126 that can illuminate a field of view of camera 122, including while beverage 104 is dispensed from nozzle 102. Light source 126 may provide lighting for beverage dispenser 100, or alternatively may be distinct from a separate light source 127 of beverage dispenser 100. Light source 126 can be fluorescent, incandescent, LED, OLED, or any other suitable light source.

In embodiments, light source 126 may selectively illuminate, such as when camera 122 is in use or when a user is at beverage dispenser 100. Light source 126 may illuminate while beverage 104 is dispensed from nozzle 102.

As shown in FIG. 1, beverage dispenser 100 can include a first light source 126*a* and a second light source 126*b*.

In embodiments, light source 126 (e.g., first light source 126*a*) can oppose and face camera 122 (e.g., first camera 122*a*) to illuminate the field of view.

Light source 126 may selectively illuminate with wavelengths in the range of 300 nm-1100 nm. In such embodiments, image analysis, such as linear unmixing analysis discussed in further detail herein, can be improved by increasing spectral information content.

Alternatively, light source 126 may illuminate within a particular wavelength range, such as wavelength ranges corresponding to white light. Such embodiments allow for analysis (e.g., spectral decomposition) of a single image and real time analysis of the dispensed beverage 104.

Figure 4:
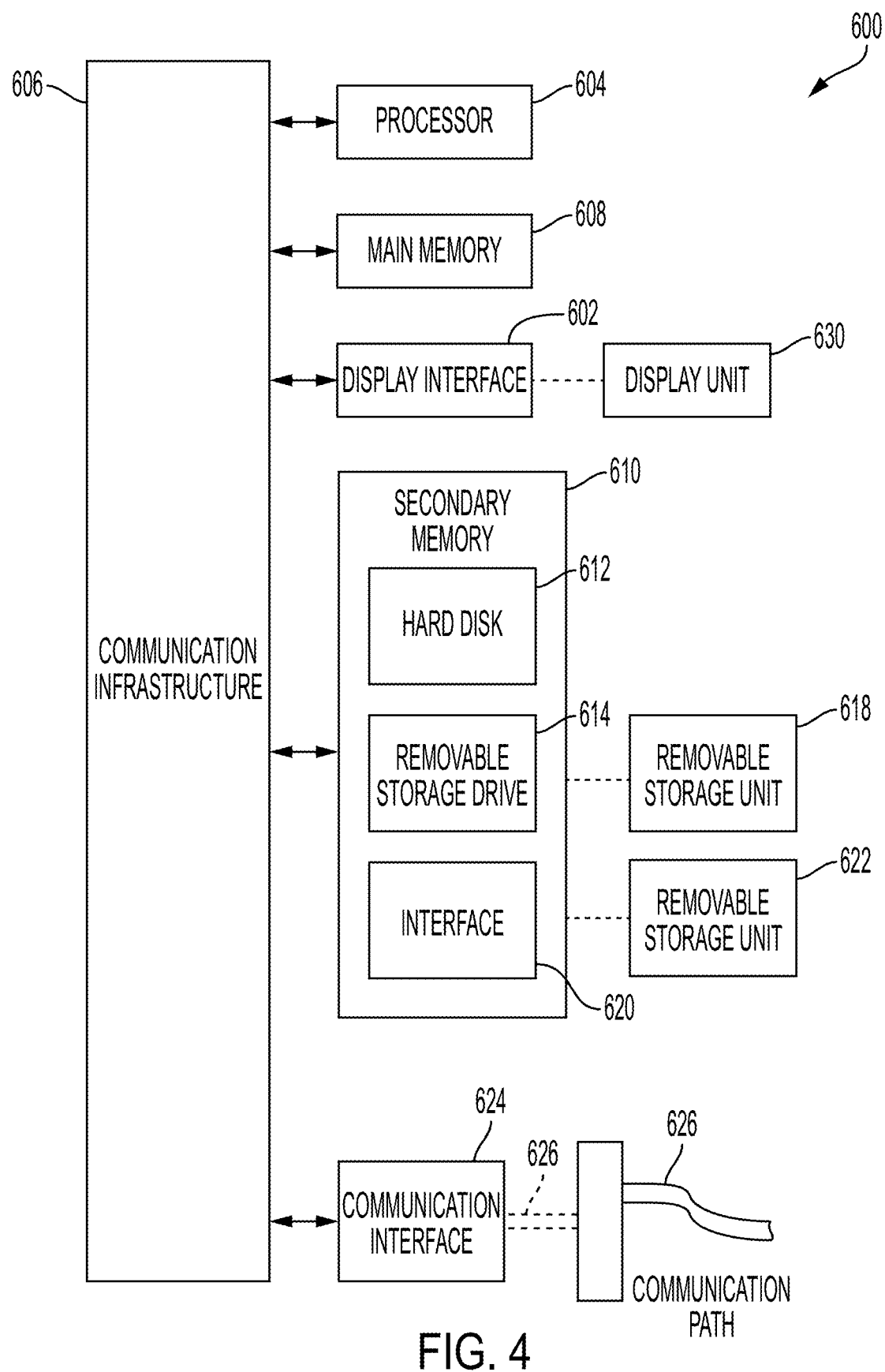
FIG. 4 shows an exemplary computer of the beverage dispenser according to an embodiment.
Figure 5:
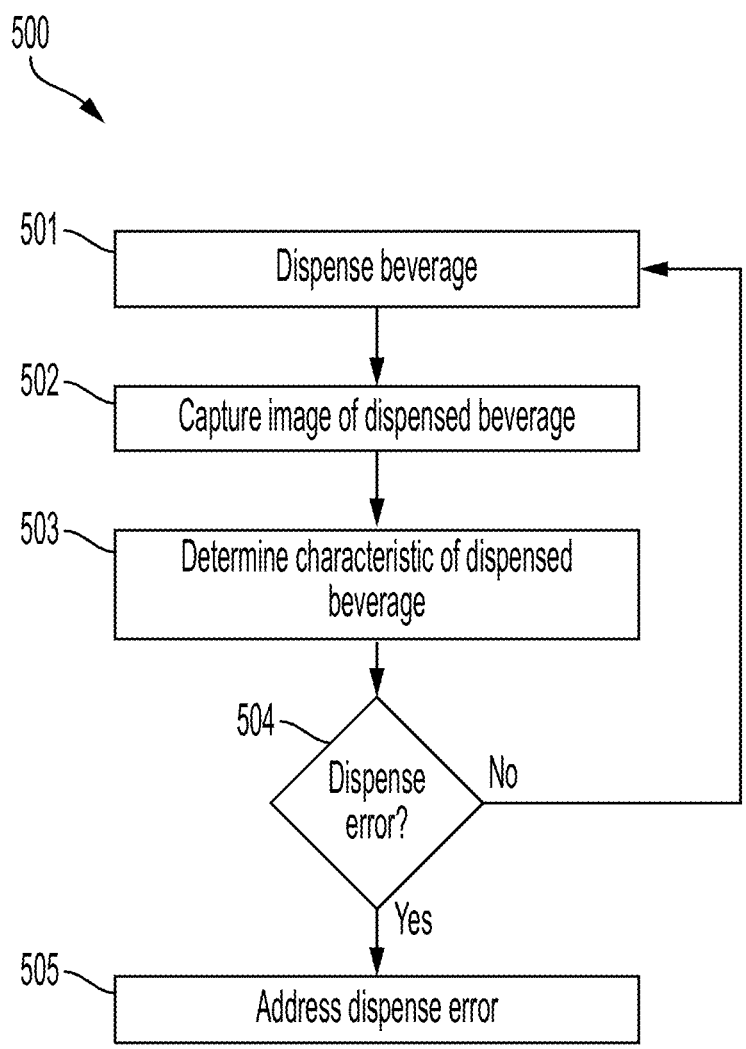
FIG. 5 shows an exemplary process of monitoring a dispensed beverage according to an embodiment.

In embodiments, beverage dispenser 100 can include a computer 600 to analyze the image of beverage 104 and determine a characteristic of beverage 104. FIG. 4 illustrates an exemplary computer 600 in which embodiments, or portions thereof, may be implemented as computer-readable code. For example, aspects of the process 500 or process 800, as discussed further herein, may be implemented via computer 600.

If programmable logic is used, such logic may execute on a commercially available processing platform or a special purpose device. One of ordinary skill in the art may appreciate that embodiments of the disclosed subject matter can be practiced with various computer configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the inventions may be implemented in terms of this example computer 600. After reading this description, it will become apparent to a person skilled in the relevant art how to implement one or more of the inventions using other computers or computer architectures. Although operations may be described as a sequential process, some of the operations may in fact be performed in parallel, concurrently, or in a distributed environment, and with program code stored locally or remotely for access by single or multiprocessor machines. In addition, in some embodiments the order of operations may be rearranged without departing from the spirit of the disclosed subject matter.

Processor 604 may be a special purpose or a general purpose processor device. As will be appreciated by persons skilled in the relevant art, processor 604 may also be a single processor in a multi-core/multiprocessor system, such system operating alone, or in a cluster of computing devices operating in a cluster or server farm. Processor 604 is connected to a communication infrastructure 606, for example, a bus, message queue, network, or multi-core message-passing scheme.

Computer 600 can include a main memory 608, for example, random access memory (RAM), and may also include a secondary memory 610. Secondary memory 610 may include, for example, a hard disk drive 612, or removable storage drive 614. Removable storage drive 614 may include a floppy disk drive, a magnetic tape drive, an optical disk drive, a flash memory, a Universal Serial Bus (USB) drive, or the like. The removable storage drive 614 reads from or writes to a removable storage unit 618 in a well-known manner. Removable storage unit 618 may include a floppy disk, magnetic tape, optical disk, etc. which is read by and written to by removable storage drive 614. As will be appreciated by persons skilled in the relevant art, removable storage unit 618 includes a computer usable storage medium having stored therein computer software or data.

Computer 600 may include a display interface 602 (which can include input and output devices such as keyboards, mice, etc.) that forwards graphics, text, and other data from communication infrastructure 606 (or from a frame buffer not shown) for display on a display unit 630.

In implementations, secondary memory 610 may include other similar means for allowing computer programs or other instructions to be loaded into computer 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer 600.

Computer 600 may also include a communication interface 624. Communication interface 624 allows software and data to be transferred between computer 600 and external devices, such as camera 122. Communication interface 624 may include a modem, a network interface (such as an Ethernet card), a communication port, a PCMCIA slot and card, or the like. Software and data transferred via communication interface 624 may be in the form of signals, which may be electronic, electromagnetic, optical, or other signals capable of being received by communication interface 624. These signals may be provided to communication interface 624 via a communication path 626. Communication path 626 carries signals and may be implemented using wire or cable, fiber optics, a phone line, a cellular phone link, an RF link or other communication channels.

In this document, the terms "non-transitory computer readable medium" "computer program medium" and "computer usable medium" can refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) or databases are stored in main memory 608 or secondary memory 610. Computer programs may also be received via communication interface 624. Such computer programs, when executed, enable computer 600 to implement the embodiments as discussed herein. In particular, the computer programs, when executed, enable processor 604 to implement the processes of the embodiments discussed here. Accordingly, such computer programs represent controllers of computer 600. Where the embodiments are implemented using software, the software may be stored in a computer program product and loaded into computer 600 using removable storage drive 614, interface 620, and hard disk drive 612, or communication interface 624.

Embodiments of the inventions also may be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Monitoring of Dispensed Beverage

The following describes monitoring computer 600 can perform based upon one or more image of the dispensed beverage 104. In embodiments, computer 600 can implement instructions stored on a non-transitory computer readable medium that cause computer 600 to implement a process 500 of monitoring beverage 104 dispensed from beverage dispenser 100. Beverage dispenser 100 can be any of the embodiments of beverage dispenser 100 discussed previously.

The process 500 can include, at step 501, dispensing beverage 104 from beverage dispenser 100. For example, a customer or operator can approach beverage dispenser 100 and select a particular beverage 104 (herein after "selected" beverage 104) for dispensing.

In embodiments, computer 600 can control beverage dispenser 100 to dispense selected beverage 104 according to a recipe of the selected beverage 104. Computer 600 may store a recipe of each beverage 104 that beverage dispenser 100 is configured to dispense. For example, computer 600 can control flow of ingredients from the ingredient supplies, through ingredient pathway 120, and out nozzle 102 to dispense the selected beverage 104. Computer 600 can automatically detect a presence of cup 112, for example using a motion detector (not shown) that activates camera 122, and initiate dispensing of beverage 104 without any physical user interaction beyond placing cup 112 on dispense bay 124 of beverage dispenser 100. The process 500 can include a user placing cup 112 on dispense bay 124 of beverage dispenser 100 and the dispensing can be automatically initiated by computer 600 based upon the automatic detection of cup 112.

In embodiments, one or more aspects of beverage dispenser 100 may be mechanically controlled, e.g., a user may press cup 112 against a lever (not shown) to initiate dispensing or a user may push a button (not shown) to initiate dispensing.

At step 502, process 500 can include capturing one or more images of dispensed beverage 104. Computer 600 can control camera 122 to capture images. Computer 600 can automatically control camera 122 to capture images in response to an initiation of dispensing. Computer 600 can automatically control camera 122 to capture one or more images prior to, during, or after dispensing.

At step 503, process 500 can include analyzing the captured image or images to determine a characteristic of dispensed beverage 104. The characteristic of dispensed beverage 104 may be, alone or in combination, an additive ingredient characteristic, a supplemental base ingredient characteristic, or a base ingredient characteristic.

In embodiments, the characteristic may be an additive ingredient characteristic. Computer 600 may analyze the image of beverage 104 to determine an additive ingredient characteristic in a number of ways, including evaluating colors or entropy of the image of dispensed beverage 104, as discussed further herein.

In embodiments, the characteristic may be a supplemental base ingredient characteristic, such as the presence or absence of supplemental base ingredient 108. For example, computer 600 may determine a presence of carbonation, which includes both determining the presence or the absence of carbonation.

In embodiments, the characteristic may be a base ingredient characteristic, such as the presence or absence of base ingredient 106. For example, computer 600 may determine a presence of water, which includes both situations in which water is present and water is absent.

In embodiments, the characteristic may be a quality of the flow of the beverage. The quality may be represented by morphology of the beverage such as a turbulence of the beverage.

At step 504, the process can include determining whether there is a detectable error i.e., a dispense error, in the dispensing of beverage 104 at step 501 based on the characteristic of beverage 104 determined at step 503.

In embodiments, the dispense error can be an additive ingredient dispense error. For example, the additive ingredient dispense error can be a determination that the dispensed beverage 104 includes inappropriate concentrations of one or more additive ingredient 110. In embodiments, computer 600 may store target concentrations for each beverage 104 that beverage dispenser 100 is configured to dispense. Estimated concentrations of the dispensed beverage 104 may be compared to the target concentrations for the particular beverage 104. Computer 600 may determine that the dispensed beverage 104 includes an inappropriate concentration of additive ingredient 110 if the estimated concentrations is outside of a predetermined range (e.g., +/−5%) of the target concentration for beverage 104.

Additionally or alternatively, the dispense error can be a determination that the wrong additive ingredient 110 is dispensed. For example, for beverage dispenser 100 embodiments that can dispense different beverages from the same nozzle 102, a user may select one of a plurality of beverages 104 for dispensing. Computer 600 can determine an additive ingredient dispense error when beverage dispenser 100 dispenses a beverage 104 other than the selected beverage 104 at step 501.

In embodiments, computer 600 can determine base ingredient or supplemental base ingredient dispense errors, such as gross failures in the quantity of supplemental base ingredient 108 dispensed. One example of detectable gross error of supplemental base ingredient 108 is a failure to carbonate a beverage 104 that requires carbonation.

If computer 600 determines that there is a dispense error at step 504, the process 500 can proceed to step 505, at which the dispense error may be addressed.

In embodiments, addressing the dispense error may include disseminating an alert that the dispense error occurred.

In embodiments, the alert can be displayed on a display of beverage dispenser 100.

In embodiments, the alert can be sent on a network for to an operator that may be designated for further diagnosis or repair.

In embodiments, the alert can include automatically re-ordering of a product associated with the dispense error.

If computer 600 determines that there is no detected dispense error at step 504, the process 500 may conclude or repeat step 501 with a new dispense.

Linear Unmixing Analysis

In embodiments, steps 503 and 504 can involve a linear unmixing analysis. Linear unmixing analysis can be particularly accurate for beverage 104 that includes an additive ingredient 110 having a color that is substantially different from a color of base ingredient 106 (herein after a "high contrast additive ingredient"). For example, linear unmixing analysis can be particularly accurate for monitoring a dispensed cola beverage 104, which contains an additive ingredient 110 syrup having a color substantially different from a color of base ingredient 106, i.e., carbonated water.

Linear unmixing analysis can utilize measured optical data y of the dispensed beverage 104 as well as calibrated optical data M of the selected beverage 104 to quantitatively solve for an estimated concentration c of additive ingredient 110 relative to base ingredient 106 along with an associated error E of the linear unmixing analysis. Linear unmixing analysis can involve using calibrated optical data M collected from constituent ingredients of the dispensed beverage 104 in a model to recreate measured optical data y of the dispensed beverage 104 while minimizing error E associated with the model. The linear unmixing analysis can be performed on a per pixel basis.

In embodiments, the measured optical data y can be decomposed optical data from the image of the dispensed beverage 104. Computer 600 can decompose the optical data from the image of the dispensed beverage 104 into pixels. Decomposed optical data can include RGB values contained within one more pixels of an image of the dispense. For example:

$$y = \begin{pmatrix} R_{pix} \\ G_{pix} \\ B_{pix} \end{pmatrix}$$

Base ingredient 106 as used at least in reference to the linear unmixing analysis can include base ingredient 106 with or without supplemental base ingredient 108 (e.g., carbonation) depending on the recipe for particular dispensed beverage 104. In embodiments in which a recipe includes base ingredient 106 with supplemental base ingredient 108 such as carbonation, the calibrated optical data M includes supplemental base ingredient 108 such as carbonation mixed together with base ingredient 106 but without additive ingredient 110.

Reference to additive ingredient 110 as used at least in reference to the linear unmixing analysis can include one or more additive ingredient 110 depending on the recipe for the particular dispensed beverage 104. In embodiments in which a recipe includes more than one additive ingredient 110, the calibrated optical data M includes information of all additive ingredients required for the beverage recipe dispensed together plus base ingredient 106.

The calibrated optical data M can be collected for each beverage 104 that beverage dispenser 100 is configured to dispense. The calibrated optical data M can be stored by computer 600 for use in linear unmixing analysis. For example, in embodiments computer 600 can store calibrated optical data $M_1$ for a first beverage 104a and calibrated optical data $M_2$ for a second beverage 104b. The calibrated optical data $M_1$ for first beverage 104a and calibrated optical data $M_2$ for second beverage 104b can be different.

In embodiments, collecting the calibrated optical data M can include independently dispensing additive ingredient 110 of beverage 104 and base ingredient 106 of beverage 104. In embodiments, calibrated optical data M can be collected only once for each beverage 104.

In embodiments, calibrated optical data M can be collected intermittently, for example after scheduled maintenance of beverage dispenser 100 or after ingredient supplies are changed or replenished.

Calibrated optical data M can include color values, such as red, green, and blue (RGB) values, of additive ingredient 110 and base ingredient 106. For example, computer 600 can determine the average color values contained within the pixels of an image of the independent dispense of additive ingredient 110 and average color values contained within the pixels of an image of the independent dispense of base ingredient 106. Calibrated optical data M can be a matrix of the average color values of additive ingredient 110 and base ingredient 106 for beverage 104. For example:

$$M = \begin{pmatrix} R_{add} & G_{add} & B_{add} \\ R_{base} & G_{base} & B_{base} \end{pmatrix} \text{ where } \begin{pmatrix} R_{add} \\ G_{add} \\ B_{add} \end{pmatrix}$$

represents the average RGB values contained within the pixels of an image of the independent dispense of additive ingredient 110, and $$\begin{pmatrix} R_{base} \\ G_{base} \\ B_{base} \end{pmatrix}$$

represents the average RGB values contained within pixels of an image of the independent dispense of base ingredient 106.

Calibrated optical data M may be unique for each beverage 104 dispensed by beverage dispenser 100. In embodiments, calibrated optical data $M_1$ for first beverage 104a and calibrated optical data $M_2$ for second beverage 104b can be matrices of average RGB color values. The average RGB color values for calibrated optical data $M_1$ for the first beverage 104a can be different from the average RGB color values calibrated optical data $M_2$ for second beverage 104b.

In embodiments, linear unmixing analysis can include computer 600 quantitatively solving for an estimated concentration c of additive ingredient 110 relative to base ingredient 106 while minimizing associated error E using the equation [1].

$$y = Mc + E \qquad [1]$$

Estimated concentration c may be the characteristic of additive ingredient 110 determined at step 503 of process 500.

Figure 6A:
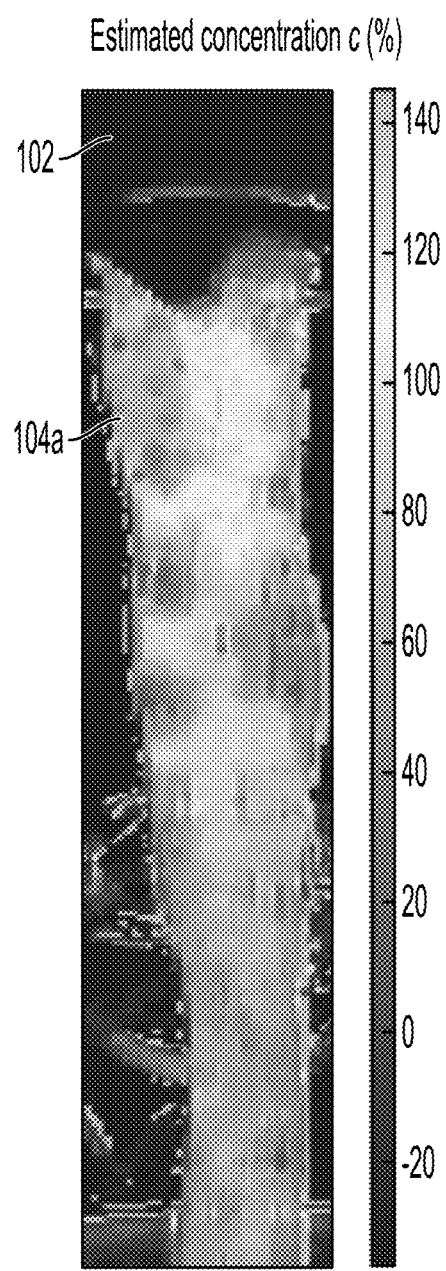
FIG. 6A shows a heat map of estimated concentration percentage of an additive ingredient of a first dispensed beverage using calibrated optical data for the first beverage according to an embodiment.
Figure 6B:
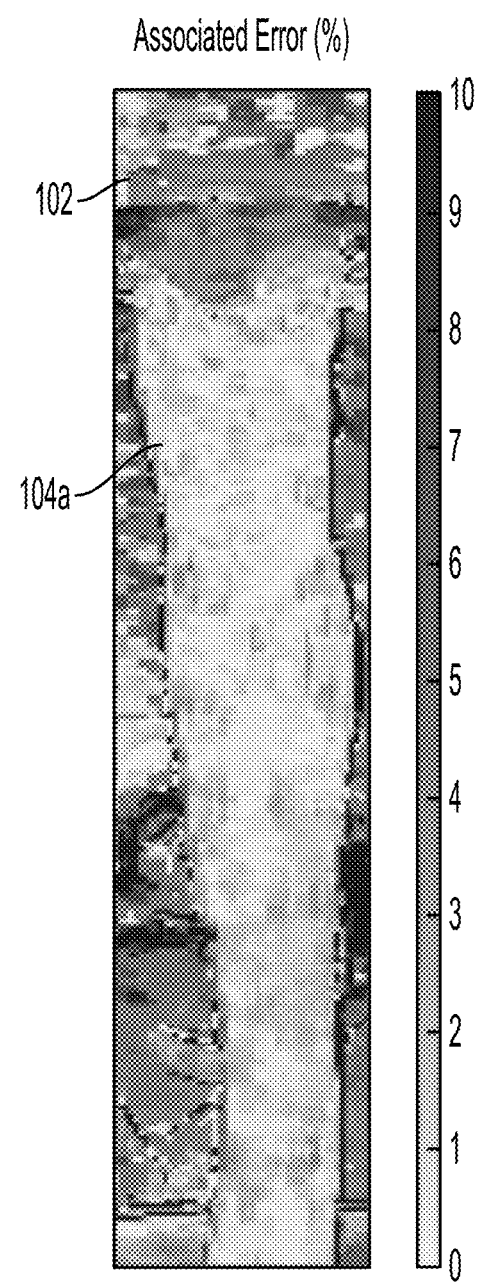
FIG. 6B shows a heat map of error associated with the estimated concentration of FIG. 6A.

FIGS. 6A and 6B illustrate heat maps of solutions to equation [1] using an image of a dispensed beverage 104 (e.g., first beverage 104a) that matches beverage 104 selected at step 501, i.e., the selected beverage 104. FIG. 6A shows the estimated concentration c on a per pixel basis of the selected beverage 104. FIG. 6B shows the associated error E of the linear unmixing analysis on a per pixel basis for the selected beverage 104.

When the selected beverage 104 (e.g., first beverage 104a) is dispensed, computer 600 is able to solve equation [1] for estimated concentration c of dispensed beverage 104 and with an acceptable associated error E (e.g., within +/−5% of the measured optical data y as shown in FIG. 6B) using optical data $M_1$ for first beverage 104a. In such embodiments, computer 600 may determine that no dispense error occurred at step 504. FIGS. 6A and 6B demonstrate that linear unmixing analysis can quantitatively estimate concentration c of dispensed beverage 104 with low associated error using optical data M for the selected beverage 104.

Figures 7A, 7B:
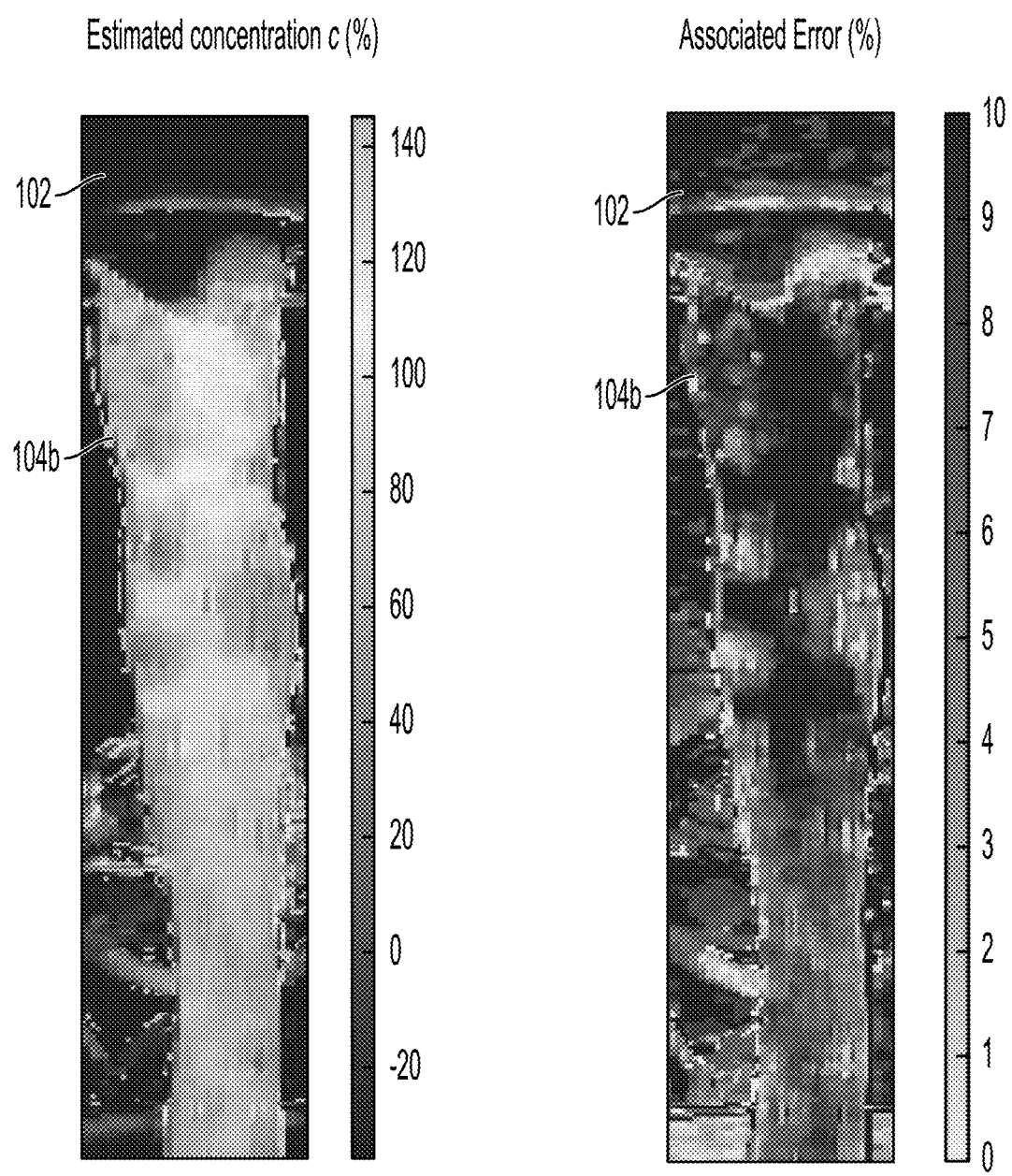
FIG. 7A shows a heat map of estimated concentration percentage of an additive ingredient of a first dispensed beverage using calibrated optical data for a second beverage according to an embodiment.
FIG. 7B shows a heat map of error associated with the estimated concentration of FIG. 7A.

FIGS. 7A and 7B illustrate heat maps of solutions to equation [1] using an image of a dispensed beverage 104 (e.g., second beverage 104b) that does not match beverage 104 selected at step 501, i.e., an unintended beverage 104. FIG. 7A shows the estimated concentration c on a per pixel basis of the unintended beverage 104. FIG. 7B shows the associated error E of the linear unmixing analysis on a per pixel basis for the unintended beverage 104.

For the unintended beverage 104, computer 600 is able to solve equation [1] for estimated concentration c of the dispensed beverage 104 using the optical data $M_1$ for the selected beverage 104 (e.g., first beverage 104a). Nevertheless, the associated error E required for the solution is unacceptable (e.g., outside a range of +/−5% of the measured optical data y, as shown in FIG. 7B) because the optical data $M_1$ for the selected beverage (e.g. first beverage 104a) does not correspond to the dispensed unintended beverage 104 (e.g., second beverage 104b). In such embodiments, computer 600 may determine that a dispense error occurred at step 504, since the associated error is unacceptable. FIGS. 7A and 7B demonstrate that linear unmixing analysis can be used to detect dispensing of an unintended beverage 104.

Morphological Analysis

In embodiments, steps 503 and 504 can include a morphological analysis. Morphological analysis can be particularly useful for beverage 104 having additive ingredient 110 with a color that is substantially similar to a color of base ingredient 106 (herein after a "low contrast additive ingredient"). For example, linear unmixing analysis can be particularly useful for monitoring a dispensed lemon-flavored soft drink, which contains additive ingredient 110 (i.e., syrup) having a color substantially similar to a color of base ingredient 106 (i.e., carbonated water).

In embodiments, morphological analysis can be qualitative. For example, morphological analysis can determine the presence or absence of additive ingredient 110 in dispensed beverage 104.

In embodiments, morphological analysis can include measuring an entropy (e.g., an optical entropy) of dispensed beverage 104. The measured entropy can be the additive ingredient characteristic determined at step 503. The entropy of dispensed beverage 104 can be compared to an expected entropy. The expected entropy may be experimentally determined from a correct dispense of each beverage 104 and may be stored by computer 600 for use in the morphological analysis. If the measured entropy is outside of an acceptable range (e.g., +/−5% of the expected entropy), computer 600 may determine that there is a dispense error at step 504. The expected entropy may be unique to each beverage 104.

Combined Linear Unmixing and Morphological Analysis

Figure 8:
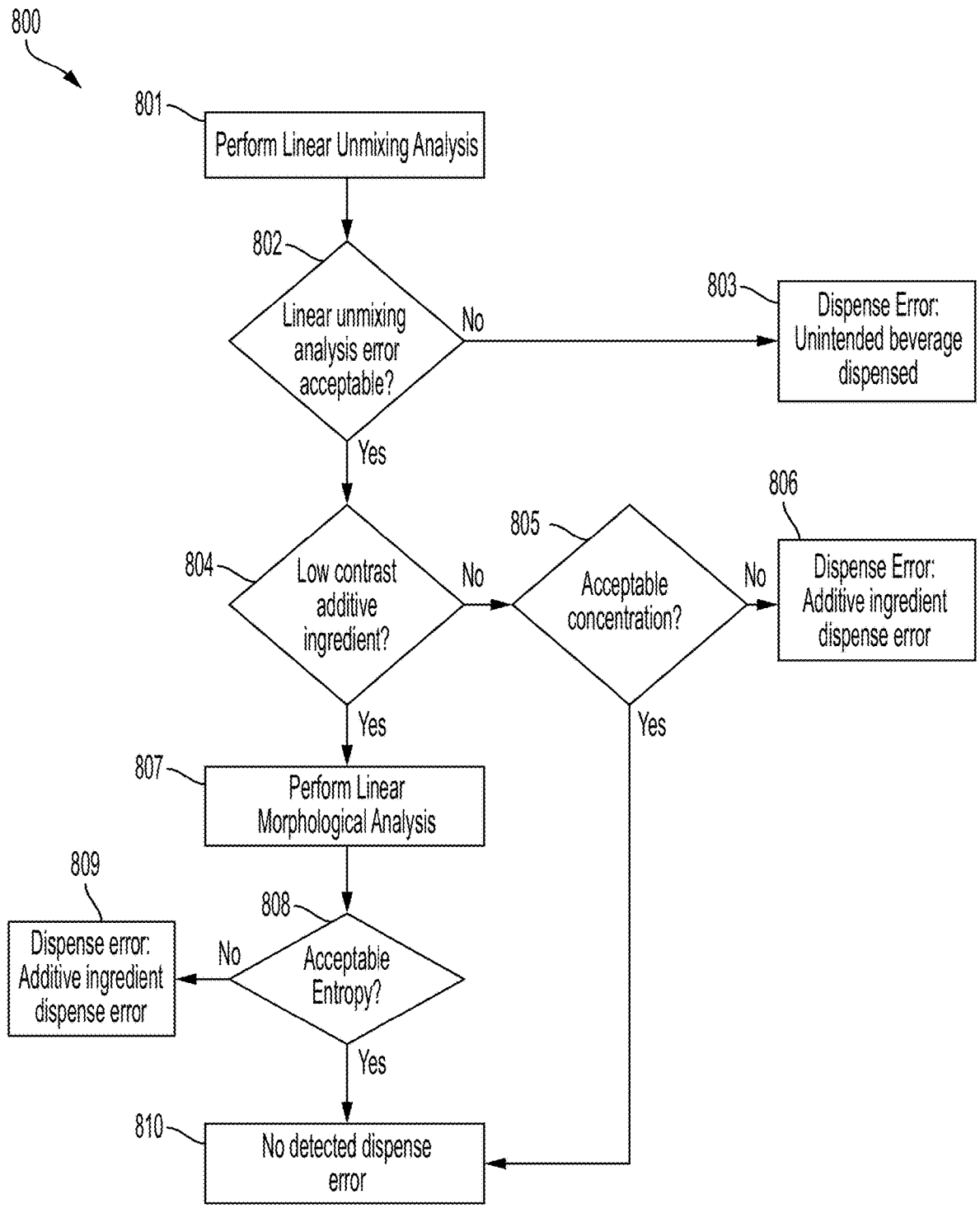
FIG. 8 shows an exemplary process of determining whether there is a dispense error using a combination of linear unmixing analysis and morphological analysis according to an embodiment.

FIG. 8 shows a process 800 of determining whether there is a dispense error using a combination of linear unmixing analysis and morphological analysis. Process 800 can be a sub-process of process 500. For example, process 800 can be a sub-process of determining whether there is a dispense error at step 504. Alternatively process 800 can be performed independently from process 500.

Process 800 can be particularly useful for beverage dispenser 100 embodiments that are configured to dispense more than one beverage 104 including at least one beverage 104 having a high contrast additive ingredient and at least one beverage 104 having a low contrast additive ingredient. In such embodiments, linear unmixing analysis alone may be insufficient for distinguishing between certain types of dispense errors. For example, if selected beverage 104 (e.g., cola) includes a high contrast additive ingredient and an unintended beverage 104 (e.g., a lemon-flavored soft drink) having a low contrast additive ingredient is dispensed, linear unmixing analysis may solve equation [1] for a low estimated concentration c of additive ingredient 110 of the selected beverage 104 (e.g., cola) and with low associate error E. In such circumstances, linear unmixing analysis may determine that there is a dispense error because the estimated concentration c is lower than the expected concentration for selected beverage 104. Nevertheless, linear unmixing analysis alone may not be able to determine that the dispense error was actually the result of dispensing an unintended beverage 104 (e.g., a lemon-flavored soft drink) having a low contrast additive ingredient. In such circumstances, process 800 may improve the diagnostic capability of beverage dispenser 100 by determining the dispense error with greater specificity.

Process 800 can include, at step 801, performing linear unmixing analysis of the image of dispensed beverage 104 to determine an estimated concentration c and an associated error E, as previously described.

At step 802, the process 800 can include determining whether associated error E of the linear unmixing analysis performed in step 801 is acceptable (e.g., within a range of +/−5% of the measured optical data y). If computer 600 determines that associated error E required for the solution is unacceptable (e.g., outside a range of +/−5% of the measured optical data y), the process may proceed to step 803 and determine that an unintended beverage dispense error occurred, i.e., that a beverage 104 other than the selected beverage 104 was dispensed from beverage dispenser 100. In embodiments in which process 800 is a sub-process of process 500, process 500 can proceed from step 504 to step 505 of process 500 and address the dispense error.

If computer 600 determines that the associated error E is acceptable (e.g., within a range of +/−5% of the measured optical data y), process 800 may proceed to step 804.

At step 804, process 800 can include evaluating whether selected beverage 104 includes a low contrast additive ingredient. A contrast classification of the additive ingredients for each beverage 104 that beverage dispenser 100 is configured to dispense may be stored in computer 600. The contrast classification may classify each beverage 104 as a low contrast additive ingredient or a high contrast additive ingredient. Step 804 can include computer 600 determining whether the selected beverage 104 includes a low contrast additive ingredient based upon the classification. If it is determined that the selected beverage 104 includes a low contrast additive ingredient, the process 800 may proceed to step 807. If it is determined that the selected beverage 104 does not include a low contrast ingredient, process 800 may proceed to step 805.

At step 805, process 800 can evaluate whether the estimated concentration c is acceptable. Computer 600 may store a range of acceptable concentrations of additive ingredient 110 for each beverage 104 dispensed. Computer 600 may compare the estimated concentration c to the range of acceptable concentrations of additive ingredient 110 for the selected beverage 104. If computer 600 determines that the estimated concentration c is within the range of acceptable concentrations of additive ingredient 110 for the selected beverage 104, process 800 may proceed to step 810, at which computer 600 may determine that there is no detected dispense error. In embodiments in which process 800 is a sub-process of process 500, process 500 can proceed from step 810 to step 501 restarting the process 500.

If computer 600 determines that the estimated concentration c is outside of the range of acceptable concentrations of additive ingredient 110 for the selected beverage 104, process 800 may proceed to step 806 at which computer 600 may determine that there is an additive ingredient dispense error. In embodiments, the additive ingredient dispense error can be a determination that the concentration of additive ingredient 110 is too low. In embodiments in which process 800 is a sub-process of process 500, process 500 can proceed from step 806 to step 505 of process 500 and address the dispense error.

Process 800 can include, at step 807, performing a morphological analysis of the image of the dispensed beverage 104 to determine an entropy of the dispensed beverage 104, as previously described.

At step 808, the process 800 can evaluate whether the entropy of the dispensed beverage 104 determined at step 807 is within a range of acceptable entropy values for selected beverage 104. The acceptable range may be +/−5% of the expected entropy of the dispensed beverage 104. The range of acceptable entropy values for each beverage 104 may be stored in computer 600. If computer 600 determines that the entropy is within the range of acceptable entropy values for the selected beverage 104, the process 800 may proceed to step 810.

If computer 600 determines that the entropy of dispensed beverage 104 is outside of the range of acceptable entropy values for the selected beverage 104, process 800 may proceed to step 809 at which computer 600 may determine that there is an additive ingredient dispense error. In embodiments, the additive ingredient dispense error can be a determination that the supply of additive ingredient 110 is too low, e.g., that beverage dispenser 100 is failing to supply additive ingredient 110. In embodiments in which process 800 is a sub-process of process 500, process 500 can proceed from step 809 to step 505 of process 500 and address the dispense error.

Supplemental Base Ingredient Characteristic Analysis

In embodiments, computer 600 may analyze images of dispensed beverage 104 to determine a supplemental base ingredient characteristic. As discussed above, the supplemental base ingredient characteristic may be the characteristic determined at step 503 of process 500. For example, computer 600 may analyze images of the dispensed beverage 104 to determine whether carbonation is present or absent in the dispensed beverage 104.

In embodiments, computer 600 can analyze images of the dispensed beverage 104 to detect edges of dispensed beverage 104. Based upon the detected edges of dispensed beverage 104, computer 600 can determine whether carbonation is present or absent in dispensed beverage 104. For example, the computer may analyze the distance between detected edges of dispensed beverage 104, the number of detected edges of dispensed beverage 104, the shape of detected edges of dispensed beverage 104, or other characteristic quality of detected edges of dispensed beverage 104.

In embodiments, computer 600 can analyze images of dispensed beverage 104 to detect color of dispensed beverage 104. Based upon the color (e.g., how light or dark dispensed beverage 104 is), computer 600 can determine whether carbonation is present or absent in dispensed beverage 104.

In embodiments, computer 600 can analyze images of dispensed beverage 104 to detect the presence or absence of droplets outside of the main body of dispensed beverage 104. Depending on whether droplets are detected outside of the main body of dispensed beverage 104, computer 600 can determine whether carbonation is present or absent in dispensed beverage 104.

Figure 9A:
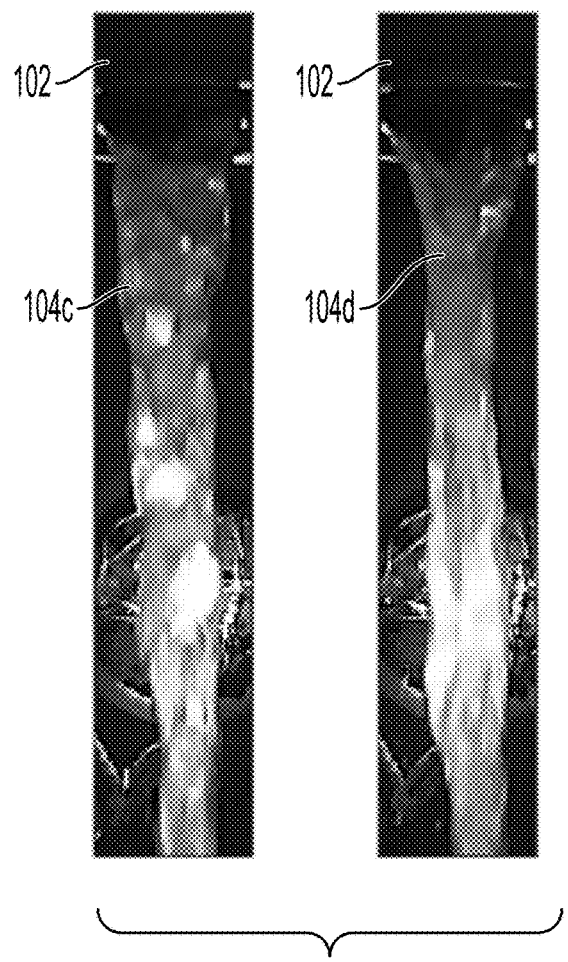
FIG. 9A shows images of carbonated and flat beverage streams according to an embodiment.
Figure 9B:
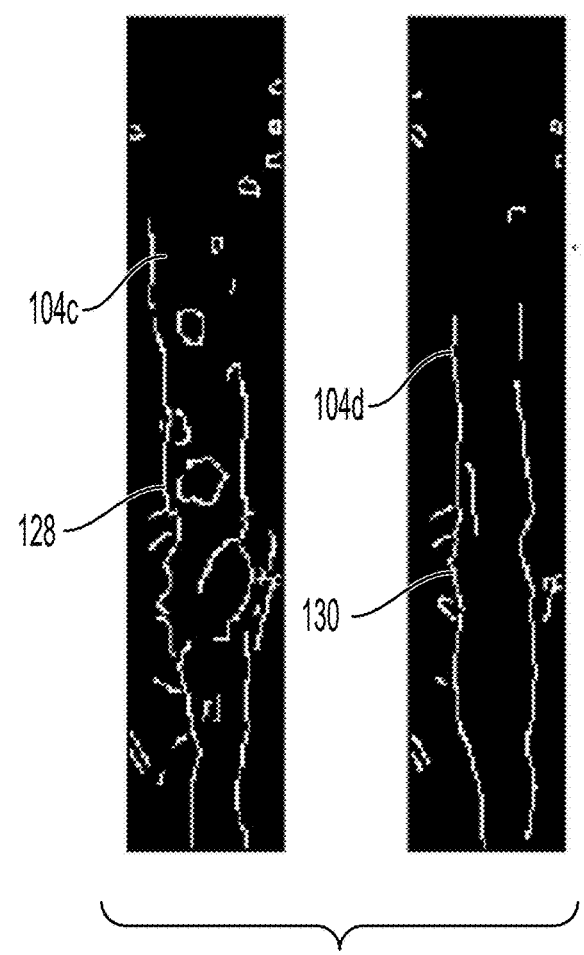
FIG. 9B shows edge detection analysis performed on the images of FIG. 9A.

FIG. 9A shows images of two dispensed beverages 104. A carbonated dispensed beverage 104c and a flat dispensed beverage 104d, i.e., a dispensed beverage 104 without carbonation. FIG. 9B shows images of edges 128 of the carbonated dispensed beverage 104c and edges 130 of the flat dispensed beverage 104d detected by computer 600 from images shown in FIG. 9A. The detected edges can be compared to expected edges for the selected beverage 104. The expected edges may be beverage 104 specific and may be stored in computer 600. If t the detected edges deviate significantly from the expected edges for the selected beverage 104, computer 600 may determine at dispense error occurred at step 504 of process 500, e.g., that beverage dispenser 100 is failing to supply carbonation to the dispensed beverage 104. If the detected edges of the dispensed beverage 104 do not deviate significantly from the expected edges, computer 600 may determine that there is no detected carbonation dispense error (e.g., at step 504 of process 500).

Fill Level Analysis

In embodiments, computer 600 may analyze images taken from camera 122 of beverage dispenser 100 to determine the fill level of the dispensed beverage 104 in cup 112. Computer 600 may control camera 122 to take a series of consecutive images as beverage 104 is dispensed into cup 112. Each image in the series of images may be time-stamped. Computer 600 may analyze the images, in real time, and may detect an edge of the top of beverage 104 in each image.

In embodiments of beverage dispenser 100 including camera 122 (e.g., second camera 122b) mounted with an at least partial top-down view into cup 112, computer 600 may detect an edge of the top of beverage 104 against the interior of cup 112.

In embodiments of beverage dispenser 100 having camera 122 (e.g., first camera 122a) with a side view of cup 112, computer 600 may detect an edge of the top of beverage 104 through cup 112 based upon a change of color of light passing through cup 112.

For each image in the series of images, computer 600 may determine the percent fill of cup 112 based upon measurements of the detected edge of the top of beverage 104 and a detected edge of the top of cup 112. Using the timestamps for the images and the determined percent fill of cup 112 for each image, computer 600 can estimate a rate of fill of cup 112. Based upon the rate of fill of cup 112 and the determined percent fill of cup 112, computer 600 can anticipate when cup 112 will be full and can control beverage dispenser 100 to terminate dispensing of beverage 104 to prevent overfill of cup 112.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A beverage dispenser comprising:
a nozzle configured to dispense a beverage;
a base ingredient supply fluidly connected to the nozzle;
an additive ingredient supply fluidly connected to the nozzle, wherein the beverage dispenser is configured to combine a base ingredient from the base ingredient supply and an additive ingredient from the additive ingredient supply to form the beverage;
a first camera configured to capture a color image of the beverage as the beverage is dispensed from the nozzle, the first camera being disposed inside a dispense bay of the beverage dispenser and having a first field of view that includes the beverage;
a second camera configured to capture a color image of the beverage as the beverage is dispensed, the second camera having a second field of view that includes the beverage and that differs from the first field of view; and
a light source that is configured to illuminate at least one of the first field of view and the second field of view.

2. The beverage dispenser of claim 1, wherein
the nozzle is configured to dispense a plurality of beverages, and
the beverage is one of the plurality of beverages.

3. The beverage dispenser of claim 1, wherein the second camera is disposed outside of the dispense bay.

4. The beverage dispenser of claim 1, wherein the first camera is positioned such that the first field of view extends perpendicular to a direction along which the beverage is dispensed.

5. The beverage dispenser of claim 1, wherein the second camera is positioned such that the first field of view extends parallel to a direction along which the beverage is dispensed and includes at least a portion of a beverage container positioned in the dispense bay.

6. The beverage dispenser of claim 1, wherein the light source comprises a first light and a second light, each of which is directed in a different direction.

7. The beverage dispenser of claim 1, wherein the first light opposes the first field of view.

8. A beverage dispenser comprising:
a nozzle configured to dispense a beverage;
a first camera configured to capture a color image of the beverage as the beverage is dispensed from the nozzle, the first camera being disposed inside a dispense bay of the beverage dispenser and having a first field of view that includes the beverage;
a second camera configured to capture a color image of the beverage as the beverage is dispensed, the second camera having a second field of view that includes the beverage and that differs from the first field of view, wherein the second camera is positioned such that the first field of view extends parallel to a direction along which the beverage is dispensed and includes at least a portion of a beverage container positioned in the dispense bay; and
a light source that is configured to illuminate at least one of the first field of view and the second field of view.

9. The beverage dispenser of claim 8, wherein the light source comprises a first light and a second light, each of which is directed in a different direction.

10. The beverage dispenser of claim 8, wherein the first light opposes the first field of view.

11. The beverage dispenser of claim 8, wherein the first camera is positioned such that the first field of view extends perpendicular to a direction along which the beverage is dispensed.

12. A beverage dispenser comprising:
a nozzle configured to dispense a beverage;
a first camera configured to capture a color image of the beverage as the beverage is dispensed from the nozzle, the first camera being coupled to the beverage dispenser and having a first field of view that includes the beverage;
a second camera configured to capture a color image of the beverage as the beverage is dispensed, the second camera disposed in the beverage dispenser and having a second field of view that includes the beverage and that differs from the first field of view;
a light source that is configured to illuminate at least one of the first field of view and the second field of view; and
a processor disposed in the beverage dispenser and operatively coupled to the first camera and the second camera, the processor configured to analyze at least one of the color image of the beverage captured by the first camera and the color image of the beverage captured by the second camera by performing a linear unmixing analysis to determine a characteristic of an additive ingredient relative to other ingredients in the beverage.

13. The beverage dispenser of claim 12, wherein the nozzle is configured to dispense a plurality of beverages, and
wherein the beverage is one of the plurality of beverages.

14. The beverage dispenser of claim 12, wherein the second camera is disposed outside of the dispense bay.

15. The beverage dispenser of claim 12, wherein the first camera is positioned such that the first field of view extends perpendicular to a direction along which the beverage is dispensed.

16. The beverage dispenser of claim 12, wherein the second camera is positioned such that the first field of view extends parallel to a direction along which the beverage is dispensed and includes at least a portion of a beverage container positioned in the dispense bay.

17. The beverage dispenser of claim 12, wherein the light source comprises a first light and a second light, each of which is directed in a different direction.

18. The beverage dispenser of claim 12, wherein the first light opposes the first field of view.

19. The beverage dispenser of claim 12, further comprising:
- a base ingredient supply fluidly connected to the nozzle; and
- an additive ingredient supply fluidly connected to the nozzle, wherein the beverage dispenser is configured to combine a base ingredient from the base ingredient supply and an additive ingredient from the additive ingredient supply to form the beverage.

20. A beverage dispenser comprising:
- a nozzle configured to dispense a beverage;
- a first camera configured to capture a color image of the beverage as the beverage is dispensed from the nozzle, the first camera being disposed inside a dispense bay of the beverage dispenser and having a first field of view that includes the beverage;
- a second camera disposed outside of the dispense bay and configured to capture a color image of the beverage as the beverage is dispensed, the second camera having a second field of view that includes the beverage and that differs from the first field of view; and
- a light source that is configured to illuminate at least one of the first field of view and the second field of view.

21. A beverage dispenser comprising:
- a nozzle configured to dispense a beverage;
- a first camera configured to capture a color image of the beverage as the beverage is dispensed from the nozzle, the first camera being disposed inside a dispense bay of the beverage dispenser and having a first field of view that includes the beverage;
- a second camera configured to capture a color image of the beverage as the beverage is dispensed, the second camera having a second field of view that includes the beverage and that differs from the first field of view, wherein the second camera is positioned such that the first field of view extends parallel to a direction along which the beverage is dispensed and includes at least a portion of a beverage container positioned in the dispense bay; and
- a light source that is configured to illuminate at least one of the first field of view and the second field of view.

\* \* \* \* \*